Figure 1:
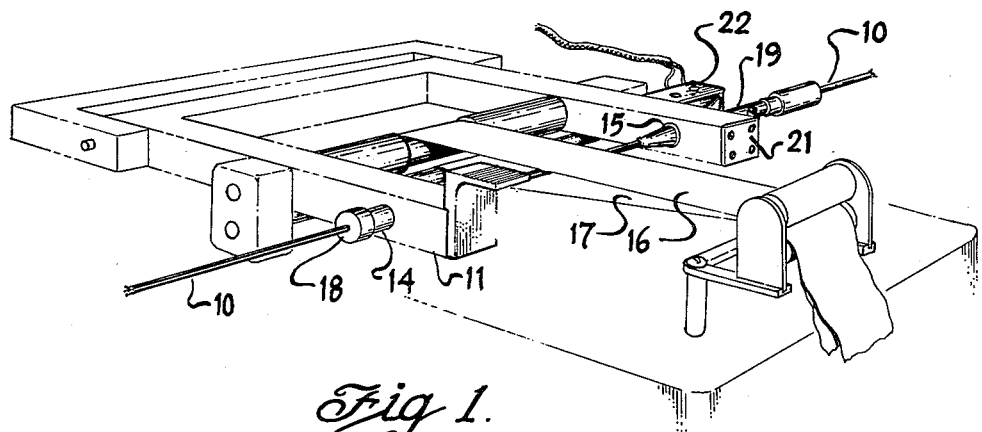

Nov. 12, 1963   R. L. PARK   3,110,430
APPARATUS FOR THREADING WIRE INTO A MACHINE
Filed March 9, 1960

INVENTOR.
RICHARD L. PARK
BY
Earl C. Hancock
AGENT.

United States Patent Office

3,110,430
Patented Nov. 12, 1963

3,110,430
APPARATUS FOR THREADING WIRE
INTO A MACHINE
Richard L. Park, Baltimore, Md., assignor to Martin-Marietta Corporation, a corporation of Maryland
Filed Mar. 9, 1960, Ser. No. 13,754
4 Claims. (Cl. 226—91)

This invention relates to methods and apparatus for threading wire into a machine designed for performing an operation on the wire and, more particularly, to methods and apparatus for threading wire into a machine which performs a processing operation on the wire in a work area and which includes means on each side of the work area for guiding the wire.

The demands of the electrical and electronics industries have brought about the development of a wide variety of machines for automatically performing operations upon great lengths of wire which operations would be highly time consuming and costly if performed by hand. Some typical wire processing operations that are now being performed upon wire by automatic machinery are forming, splicing, stripping, marking, measuring, and cutting. Quite often these machines utilize two or more guide means having holes or passageways therethrough for guiding the wire across the work area in which the machine is performing the operation on the wire, but often the spatial relation of the parts of the machine associated with this work area places a serious handicap upon the operator of the machine with respect to the initial threading of the wire through the guide means and across the work area.

One machine in which the aforementioned problem is particularly acute is in the so-called Kingsley stamping machine which is used for printing identifying symbols or indicia upon lengths of wire. The work area in which the Kingsley machine actually performs the stamping operation has a severe space restriction since the distance between the upper and lower printing heads is necessarily limited and a pair of foils must be continuously fed across this work area. In addition, the operator is confronted with a serious safety hazard when the wire is to be initially threaded into the Kingsley machine because the printing heads are maintained at a range of temperatures such as 300° F. to 400° F. for operating on Teflon wire. In the past, several methods and devices have been used in attempts to solve the aforementioned threading problems but none of these solutions have proven to be wholly satisfactory. For instance, in the Kingsley stamping machine, the most satisfactory method of wire threading involved spreading the printing foils apart with a flat instrument, feeding the wire through one of the guide means (which in the case of the Kingsley machine are holes in the arms of a U-shaped yoke) until the end of the wire can be grasped by pliers or the like, and then feeding the wire through the guide means on the other side of the work area. By this method, of course, not only is time wasted and the operator faced with the possibility of burning his hands from the hot printing heads but the foil, and the parts of the machine and/or the operator's hands are all subjected to the possibility of injury if the machine is accidently turned on while the pliers and/or the flat instrument are in the work area.

By the present invention, a method and apparatus are provided for advantageously facilitating the threading of wire into a machine whereby the aforementioned hazards and possibilities of injuries are substantially alleviated. In particular, the present invention provides an elongated member having a hole extending longitudinally therethrough and being of sufficient length to substantially span the distance between guide means on either side of the work area of a machine that performs an operation on wire, the member being designed to be slidably inserted through a hole or passageway in one of the guide means of the machine and thence across the work area. Thus the elongated member can be inserted through one of the guide means until the tip thereof is relatively close to the other guide means, and the wire can then be quickly and easily threaded through the channel defined by the passageways in the guide means and the hole through the elongated member. The member can then be slid back out of the work area and the wire will have been properly threaded for the beginning of the machine operation. Furthermore, additional safety features can be incorporated in this invention by (1) including a retaining means for ensuring that the elongated member will remain clear of the work area during operation of the machine but will leave the member readily available for threading of new wires, and (2) including means such as a switch to be actuated when the elongated member has been inserted in the passageway of one of the guide means and is in any position except the withdrawn position. By the latter safety feature, the machine cannot be accidentally actuated while the member is in the work area thereby preventing damage to the machine and/or the elongated member.

The actual shape of the elongated member used in this invention is not critical, the only restriction in this respect being that the member must be capable of being slidably inserted through the passageway in one of the guide means. In the Kingsley machine, the passageway in the yoke thereof is circular and therefore the elongated member is preferably made cylindrical. Although the detailed description hereinafter refers to the elongated member as being cylindrical, it is to be understood that this invention is not so limited.

Figure 2:
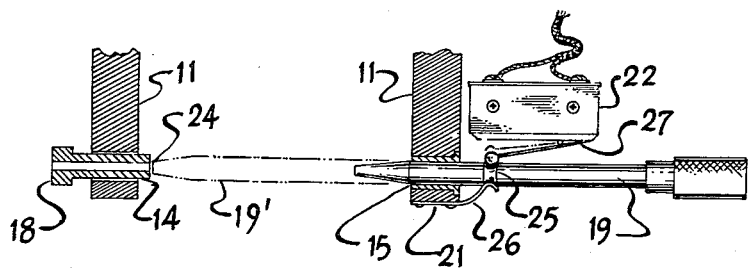
Figure 3:
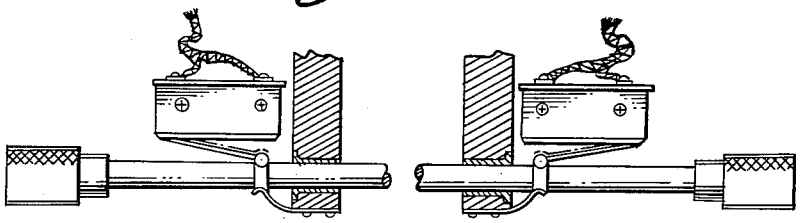

The novel features that are considered characteristic of this invention are set forth with particularity in the appended claims. The invention itself, however, both as to its organization and method of operation as well as additional features and advantages thereof will be best understood from the following description when read in connection with the accompanying drawing in which:

FIGURE 1 illustrates a typical embodiment of this invention shown as it might be incorporated in a wire-processing machine, FIGURE 2 is a sectional view of the embodiment illustrated in FIGURE 1 showing the relative positions of the movable elongated member, and FIGURE 3 reveals another typical arrangement of the present invention.

FIGURE 1 shows the arrangement of the present invention as incorporated in a wire processing machine and, by way of example, as incorporated with respect to the work area of a Kingsley stamping machine for continuously impressing symbols or indicia on long lengths of wire. For purposes of illustration, the wire 10 which is to be operated upon is shown as already having been threaded into the machine so that the relations of the parts may be more fully appreciated. The means for guiding the wire 10 in the machine is shown as U-shaped yoke 11 having passageways 14 and 15 in opposite arms thereof. In this particular machine, foils 16 and 17 having material thereon to be deposited on the wire 10 are fed over and under wire 10 respectively so that the hot printing heads (375° F.) can be pressed against foils 16 and 17 and thus impress the desired indicia upon the top and bottom of wire 10. During this operation, wire 10 is actually held in the correct position with respect to the work area by bushing 18 and the slidable cylindrical member 19, the latter being shown in its withdrawn position. Member 19 which of course has a hole extending longitudinally therethrough to accommodate the passage of wire 10 is shown in FIGURE 1 as being retained by spring 21 in the withdrawn position to prevent any interference by member 19 with the normal operation of the machine. A further safety feature is included by the addition of switch means 22 such as a micro-switch which is so connected that the machine or at least the actuating mechanism or motor will be disconnected from the source of power whenever member 19 has been inserted in passageway 15 and is in any position other than the withdrawn position.

Perhaps a better understanding of the method and apparatus of this invention can be obtained from FIGURE 2 which shows the elements of this invention in a sectional view of a portion of the embodiment illustrated in FIGURE 1. For purposes of clarity, the reference numerals used in FIGURE 1 are also used whenever applicable in FIGURE 2, but the details of the stamping machine are omitted from FIGURE 2 in order to simplify the description of the invention and its operation. The arms of yoke 11 are shown retaining bushing 18 and cylindrical member 19 in passageways 14 and 15 respectively. Cylindrical member 19 is shown in the withdrawn position but when a wire is to be threaded into the machine, it is slid through passageway 15 and across the work area of the machine until the tip thereof is in close relation to hole 24 in bushing 18. This position of member 19 is illustrated by the dotted outline indicated as 19' in FIGURE 2. The end of the wire can then be threaded into the machine by forcing it through the channel defined by hole 24 and the hole through member 19 (not shown). Then member 19 can be slid back from position 19' and out of the work area until it is once again in the position shown by the solid lines for members 19. The threading operation is then complete and the machine is ready to begin operation on the wire, the foregoing having been accomplished simply and quickly and with a minimum of hazard to the operator.

Slidable member 19 is shown in the embodiment of FIGURE 2 as having a groove 25 cut into the outside thereof so as to receive arm 26 of spring 21. By this arrangement, means is provided for retaining member 19 in the withdrawn position so that operation of the machine will not cause it to slide into the work area and thus damage the machine or impair the operation thereof, nor will member 19 be caused to slide outward (i.e.: away from position 19') during operation of the machine so as to foul the wire passing therethrough. Another safety feature shown in the embodiment of FIGURE 2 is micro-switch 22 which provides means for removing power from the machine or the drive motor thereof when member 19 is in any position except the withdrawn position. This is accomplished by the ball or roller on the end of spring-loaded arm 27 entering groove 25 and thereby connecting the operating power to the machine. It should be noted in FIGURE 2 that if member 19 is in any other position except the withdrawn position wherein arms 26 and 27 are in groove 25, then arm 27 will have been forced toward the body of the switch so as to actuate switch 22 and thereby remove power from the actuating motor of the machine until such time as member 19 is returned to the withdrawn position.

It should be realized of course that the retaining means and switching means shown in the drawings could be implemented by means other than that shown and described. For instance a raised shoulder could be included near the knurled end of member 19, the switch could be designed to remove power from the machine when the actuating arm is in the outward position and apply power when in the inward position (caused by the arm riding up onto the raised shoulder), and the retaining spring could have a cup thereon to fit on top of the shoulder. Another system for this safety switch arrangement might include a light source and photocell arrangement whereby the light beam between the light source and the photocell would be interrupted when member 19 is in the threading position thus actuating a power removal apparatus or circuitry or the like. However, the embodiment shown in FIGURES 1 and 2 has the advantages that the machine can still be operated if member 19 is entirely removed from passageway 15 and a standard bushing guide inserted in place thereof.

It is generally desirable in wire processing machines such as the Kingsley machines that the wire guiding devices have a hole therethrough of sufficient size that the wire will not become fouled due to binding as a result of too snug a fit or due to kinking when the hole is too large. It has generally been found that a hole having a diameter of about .010 inch larger than the wire diameter is most satisfactory. This desired tolerance can be easily supplied by the present invention by providing a series of cylindrical members having graduated hole diameters and all fitting in the passageway in the guiding means similar to the manner of providing drills for a drill press. In addition, bushing 18 could be made to be slidably adjustable in passageway 14 or it could even be replaced by another member similar to cylindrical member 19 if it should be desired to more closely control the point of transfer of the wire end therebetween, a typical such arrangement being shown in FIGURE 3. It should be understood that, if it should be desirable, neither member need be made long enough to substantially span the work area. Such a modification of this invention might be advantageous when the operator's visibility into the work area is restricted by the machinery therein or associated therewith. It is to be further realized that the elongated member 19 when in the fully inserted position need not actually contact the bushing or other elongated member to provide the desired wire threading channel and in fact it has been found on some occasions to be more desirable to leave a small clearance therebetween.

The method and apparatus shown and described hereinbefore are intended as being exemplary only and the invention is not intended to be strictly limited thereto. There are many variations within the spirit of this invention and these variations will be evident to a person having normal skill in the art.

What is claimed is:

1. An apparatus for facilitating the threading of a wire into a machine that performs an operation on said wire in a work area, said machine having at least one pair of guiding means each having a passageway therethrough and each being positioned on a side of said work area opposite the other of said guide means for controlling the position of said wire during the performance of said machine operation, which apparatus comprises an elongated member designed for slidable mounting in the said passageway of one of said guide means and having a hole extending longitudinally therethrough, said hole being of sufficient size to accommodate the passage of said wire therethrough, said elongated member being of a length for at least substantially bridging the distance between said guide means when said member is fully inserted in said one of said guide means, said member having one end thereof tapered for facilitating movement thereof through said work area whereby said member can be inserted in said passageway of said one of said guide means and moved across said work area so as to place the opening of said hole in close relation to the said passageway of the other of said guide means thereby forming a channel through said pair of guide means and said elongated member to materially facilitate the threading of said wire, said elongated member then being withdrawable from said work area to allow said operation of said machine, said elongated member having a transverse groove externally thereon, and means designed for coacting with said groove for forcibly retaining said elongated member when said member is in the withdrawn position.

2. An apparatus in accordance with claim 1 which includes switching means designed for actuation by said groove so as to remove power from the actuating mechanism of said machine during all times said elongated member is inserted in said one of said guide means and in a position other than the withdrawn position.

3. An apparatus in accordance with claim 1 which includes a second elongated member slidably mounted in the said passageway of said other of said guiding means and having a hole extending longitudinally therethrough whereby the position of said members and the point of transfer of said wire therebetween can be closely controlled during the threading of said wire.

4. An apparatus in accordance with claim 3 which includes releasable means for forcibly retaining said second elongated member whenever said second member is in the withdrawn position.

References Cited in the file of this patent

UNITED STATES PATENTS

| | | |
|---|---|---|
| 2,173,847 | Knebusch et al. | Sept. 26, 1939 |
| 2,591,550 | Kane | Apr. 1, 1952 |
| 2,876,534 | Savona | Mar. 10, 1959 |
| 2,983,037 | Hendrix | May 9, 1961 |
| 2,983,416 | Hanken et al. | May 9, 1961 |

FOREIGN PATENTS

| | | |
|---|---|---|
| 530,224 | Great Britain | Dec. 6, 1940 |